(12) United States Patent
De Witte et al.

(10) Patent No.: US 11,399,466 B2
(45) Date of Patent: Aug. 2, 2022

(54) AGRICULTURAL VEHICLE WITH ADJUSTABLE RASP BARS

(71) Applicant: CNH Industrial America LLC, New Holland, PA (US)

(72) Inventors: Joris De Witte, Halle (BE); Dré W. J. Jongmans, Klundert (NL); Bart M. A. Missotten, Herent (BE); Frederik Tallir, Esen (BE); Johan A. Van Der Haegen, Gavere (BE); Bart G. L. Van Hullebusch, Knesselare (BE); Pieter Van Overschelde, Sint-Andries (BE); Luc Yde, Veldegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/417,102

(22) PCT Filed: Dec. 18, 2019

(86) PCT No.: PCT/EP2019/086042
§ 371 (c)(1),
(2) Date: Jun. 21, 2021

(87) PCT Pub. No.: WO2020/127548
PCT Pub. Date: Jun. 25, 2020

(65) Prior Publication Data
US 2022/0039322 A1 Feb. 10, 2022

(30) Foreign Application Priority Data
Dec. 20, 2018 (EP) .................................... 18214546

(51) Int. Cl.
*A01F 12/18* (2006.01)
*A01F 7/06* (2006.01)
(Continued)

(52) U.S. Cl.
CPC .............. *A01F 12/181* (2013.01); *A01F 7/06* (2013.01); *A01F 12/22* (2013.01); *A01F 12/56* (2013.01); *A01F 12/24* (2013.01)

(58) Field of Classification Search
CPC .......... A01F 12/181; A01F 12/22; A01F 7/06; A01F 12/56; A01F 7/067
See application file for complete search history.

(56) References Cited

U.S. PATENT DOCUMENTS 2,217,590 A 10/1940 Heth
3,817,256 A 6/1974 Buchele et al.
(Continued)

FOREIGN PATENT DOCUMENTS

CN 105474892 A * 4/2016
DE 950158 C 10/1956
(Continued)

OTHER PUBLICATIONS

International Search Report and Written Opinion for PCT Application No. PCT/EP2019/086042 dated Feb. 28, 2020 (10 pages).
(Continued)

*Primary Examiner* — Adam J Behrens
*Assistant Examiner* — Madeline I Runco
(74) *Attorney, Agent, or Firm* — Peter Zacharias; Patrick Sheldrake

(57) ABSTRACT

A threshing and separating system for an agricultural harvester includes a concave having a plurality of perforations; a rotor having an outer surface and at least partially enclosed by the concave; and a plurality of rasp bars connected to the outer surface of the rotor, each rasp bar having a working surface defining a working angle relative to a tangent of the outer surface. At least one of the rasp bars is an adjustable rasp bar with an adjustable working surface pivotably coupled to the rotor. The system further includes an actuator
(Continued)

coupled to the adjustable rasp bar and configured to selectively pivot the adjustable working surface to adjust the working angle of the adjustable rasp bar.

14 Claims, 6 Drawing Sheets

(51) Int. Cl.
*A01F 12/22* (2006.01)
*A01F 12/56* (2006.01)
*A01F 12/24* (2006.01)

(56) References Cited

U.S. PATENT DOCUMENTS

| | | | |
|---|---|---|---|
| 5,045,025 A | 9/1991 | Underwood | |
| 7,717,777 B2 * | 5/2010 | Pope | A01F 7/067 |
| | | | 460/69 |
| 8,118,649 B1 * | 2/2012 | Murray | A01F 12/28 |
| | | | 460/5 |
| 9,807,939 B1 | 11/2017 | Kile | |
| 10,368,492 B2 * | 8/2019 | Ricketts | A01F 7/06 |
| 11,154,013 B2 * | 10/2021 | Brammeier | A01F 12/305 |
| 2007/0026913 A1 | 2/2007 | Kuchar | |
| 2012/0214560 A1 * | 8/2012 | Murray | A01F 12/22 |
| | | | 460/71 |
| 2017/0099776 A1 * | 4/2017 | Ricketts | A01F 12/22 |

FOREIGN PATENT DOCUMENTS

| | | | | |
|---|---|---|---|---|
| DE | 102009015235 A1 | 10/2010 | | |
| EP | 9071697 A2 | 2/1983 | | |
| EP | 9548411 A1 | 6/1993 | | |
| EP | 1500323 A2 | 1/2005 | | |
| EP | 1964465 A2 | 9/2008 | | |
| EP | 2675262 B1 * | 5/2015 | | A01F 12/20 |
| EP | 3259979 B1 * | 12/2019 | | A01F 12/22 |
| EP | 3424295 B1 * | 9/2020 | | A01F 29/06 |
| WO | WO-2019231415 A1 * | 12/2019 | | A01F 11/00 |

OTHER PUBLICATIONS

Extended European Search Report for European Application No. 18214546.6 dated May 21, 2021 (5 pages).

* cited by examiner

AGRICULTURAL VEHICLE WITH ADJUSTABLE RASP BARS

BACKGROUND OF THE INVENTION

The present invention relates to agricultural harvesters, and, more specifically to threshing and separating systems for agricultural harvesters.

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing and separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

As the rotor rotates, crop material is carried across the surface of the rotor. To move the crop material across a length of the rotor during rotation, multiple rasp bars are connected to the surface of the rotor and arranged in a spiral pattern to direct the crop material down the length of the rotor. The rasp bars each define a working angle relative to the surface of the rotor which may vary between 10 and 40°, with certain configurations of the rasp bars being optimal for different types of crops and harvesting conditions.

When a different configuration of the rasp bars is desired to, for example, account for differing harvesting conditions, the rasp bars must be replaced by a new set of rasp bars or the entire rotor must be replaced. In either scenario, the cost to the user in terms of both time and resources can be extremely high since the user must stop harvesting to replace the configuration of the rasp bars with an entirely separate set of rasp bars or rotor.

What is needed in the art is a threshing and separating system which can overcome some of the disadvantages of known systems.

SUMMARY OF THE INVENTION

One exemplary embodiment of the present invention provides a separating and threshing system which includes a rotor and an adjustable rasp bar pivotably coupled to the rotor with an adjustable working angle.

Another exemplary embodiment of the present invention is directed to a threshing and separating system for an agricultural harvester including a concave having a plurality of perforations; a rotor having an outer surface and at least partially enclosed by the concave; and a plurality of rasp bars connected to the outer surface of the rotor, each rasp bar having a working surface defining a respective working angle relative to a tangent of the outer surface. The threshing and separating system is characterized in that at least one of the rasp bars is an adjustable rasp bar with an adjustable working surface pivotably coupled to the rotor and an actuator coupled to the adjustable rasp bar is configured to selectively pivot the adjustable working surface to adjust the respective working angle of the adjustable rasp bar.

In some exemplary embodiments of the present invention, the adjustable rasp bar is pivotable about a pivoting axis extending in a radial direction of the rotor. The actuator may be at least partially enclosed between the adjustable rasp bar and the outer surface of the rotor. A pressurized fluid source may be fluidly coupled to the actuator. The actuator can include an elastic air bladder and/or a piston rod configured to extend and adjust the respective working angle of the adjustable rasp bar. The adjustable rasp bar may include a fixed portion fixedly connected to the rotor and an adjustable portion pivotably coupled to the rotor and including the adjustable working surface or an entirety of the adjustable rasp bar may be pivotably coupled to the rotor.

In some exemplary embodiments of the present invention, a plurality of the rasp bars are adjustable rasp bars. A pressurized fluid source and the actuator coupled to each adjustable rasp bar may be fluidly coupled to the pressurized fluid source. Each actuator may be fluidly coupled to a manifold which is fluidly coupled to the pressurized fluid source.

In some exemplary embodiments of the present invention, at least one fluid line is housed within an interior of the rotor and is fluidly coupled to the pressurized fluid source and at least one actuator. The rotor may have at least one fluid opening formed in the outer surface and the at least one fluid line extends through the at least one fluid opening.

In some exemplary embodiments of the present invention, the actuator is a pneumatic actuator.

In yet another exemplary embodiment of the present invention, an agricultural harvester includes a header and any of the preceding exemplary embodiments of a threshing and separating system which is configured to receive crop material from the header.

A possible advantage of the present invention is that the working angle of the rasp bar(s) can be adjusted during harvesting.

Another possible advantage is that adjusting the working angle of the rasp bar(s) during harvesting can allow for further tuning of the rotor responsively to crop conditions.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
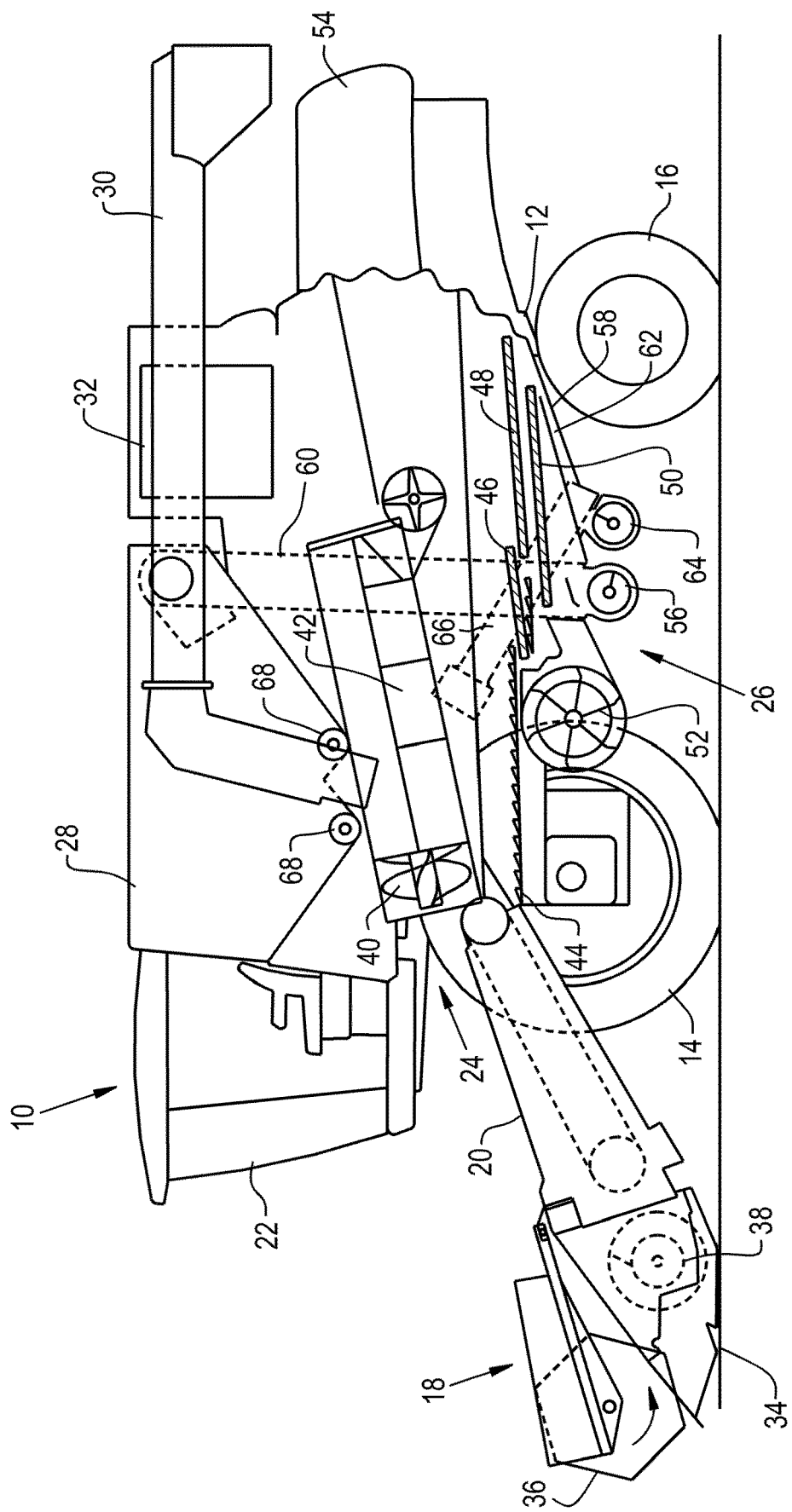
FIG. 1 is a side view of an exemplary embodiment of an agricultural harvester in the form of a combine.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. Cross augers 68 at the bottom of grain tank 28 convey the clean grain within grain tank 28 to unloading auger 30 for discharge from combine 10.

Figure 2:
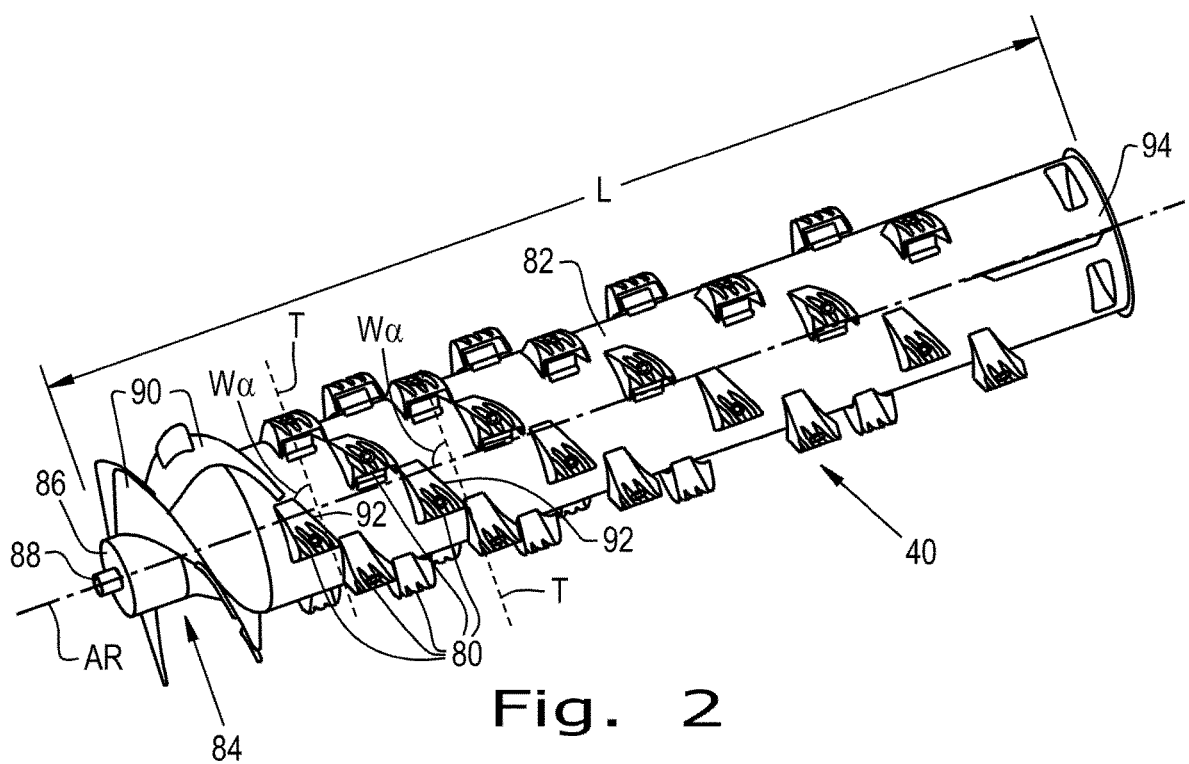
FIG. 2 is a perspective view of an exemplary embodiment of part of a threshing and separating system including a rotor and rasp bars according to the present invention.

According to an exemplary embodiment of the present invention, and referring now to FIG. 2, the rotor 40 is shown with a plurality of rasp bars 80 connected to an outer surface 82 of the rotor 40. As can be seen, the rotor 40 can include a transition area 84 which gradually increases in diameter from a longitudinal end 86 of the rotor 40 to the outer surface 82 of the rotor 40 to which the rasp bars 80 connect. As can be seen, the rotor 40 can be mounted on a bearing shaft 88 at the longitudinal end 86 of the rotor 40 to support the rotor 40 during rotation. One or more transition vanes 90 can also be connected to the rotor 40 adjacent to the transition area 84, as is known.

To help move crop material along a length L of the rotor 40 during rotation about a rotor axis of rotation AR, each of the rasp bars 80 include a working surface 92 defining a working angle Wα relative to a tangent T of the outer surface 82 to which the rasp bars 80 connect. During rotation of the rotor 40, the crop material will tend to be forced against the working surfaces 92 of the rasp bars 80 and directed by the working surfaces 92 along the length L of the rotor 40 until reaching a second longitudinal end 94 of the rotor 40. In this sense, the working angle Wα of the working surfaces 92 assist in "tumbling" the crop material across the length L of the rotor 40 during rotation of the rotor 40, with larger working angles Wα increasing the longitudinal movement speed of the crop material across the length L of the rotor 40 and, therefore, decreasing the amount of time spent by the crop material being moved by the rotor 40.

Figure 3:
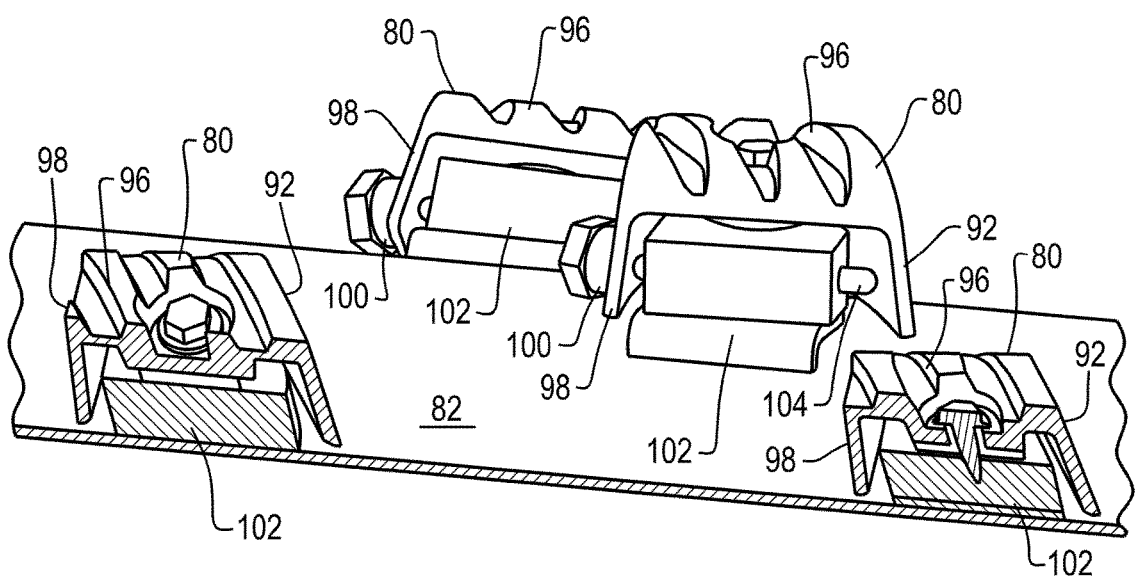
FIG. 3 is a perspective view of an exemplary embodiment of adjustable rasp bars pivotably connected to the rotor shown in FIG. 2.

Referring now to FIG. 3, a close-up view of some of the rasp bars 80 are shown. Each of the shown rasp bars 80 can have, in addition to a working surface 92, a top surface 96 and a side surface 98 opposite the working surface 92 which has a vent opening 100 formed therein. The surfaces 92, 96, 98 of the rasp bars 80 can at least partially enclose an actuator 102 in conjunction with the outer surface 82 of the rotor 40. While the actuators 102 are shown as only being partially enclosed by the rasp bars 80, which allows access to the actuators 102 for maintenance without removing the rasp bars 80, it should be appreciated that the actuators 102 can be fully enclosed by the rasp bars 80, if desired, or not enclosed by the rasp bars 80 at all. As shown, the actuators 102 can be fluid actuators, but it should be appreciated that the actuators 102 can also be electric actuators, if desired. In one preferred embodiment, the actuators 102 are pneumatic actuators to reduce the risk of crop contamination in the event that there is fluid leakage from one or more of the actuators 102. As shown in FIG. 3, each actuator 102 can include a piston rod 104 which is extended and retracted in response to fluid pressure within the actuator 102, as is known. Alternatively, the actuator may simply consist of a rod or pin which is coupled to an adjustable rasp bar and extended, retracted and/or rotated in any way to adjust the adjustable rasp bar.

Figure 4:
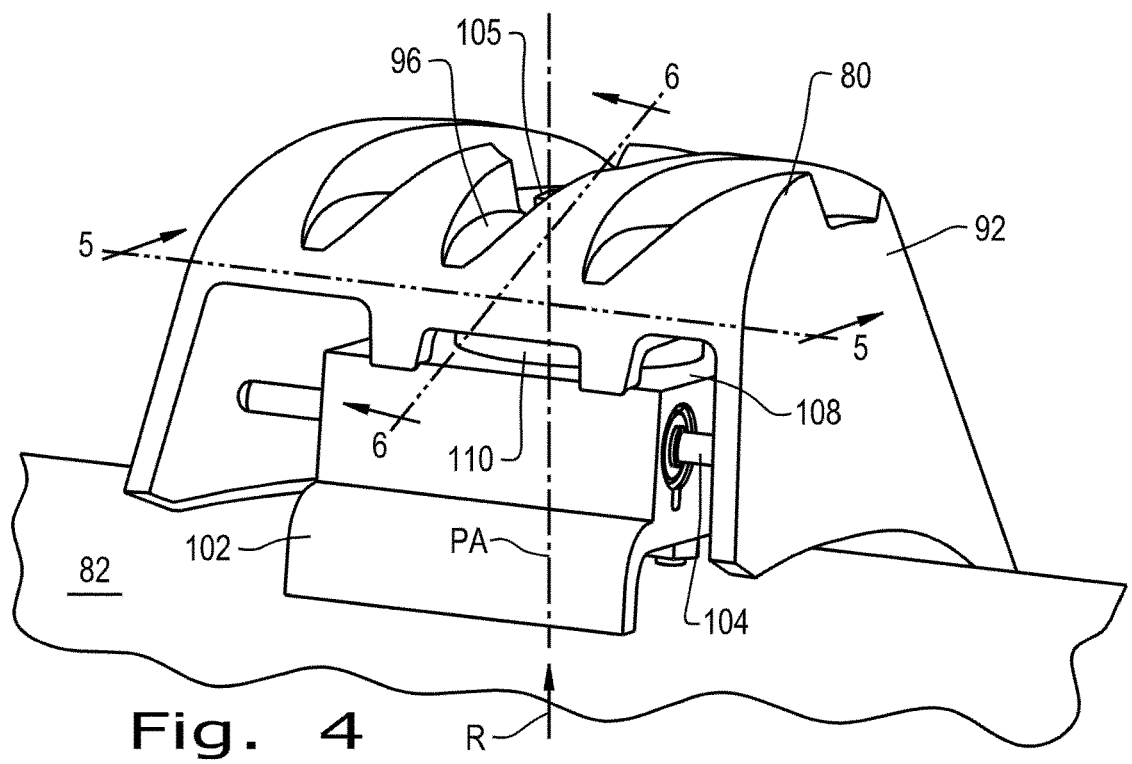
FIG. 4 is a perspective view of one of the adjustable rasp bars shown in FIG. 3.
Figure 5:
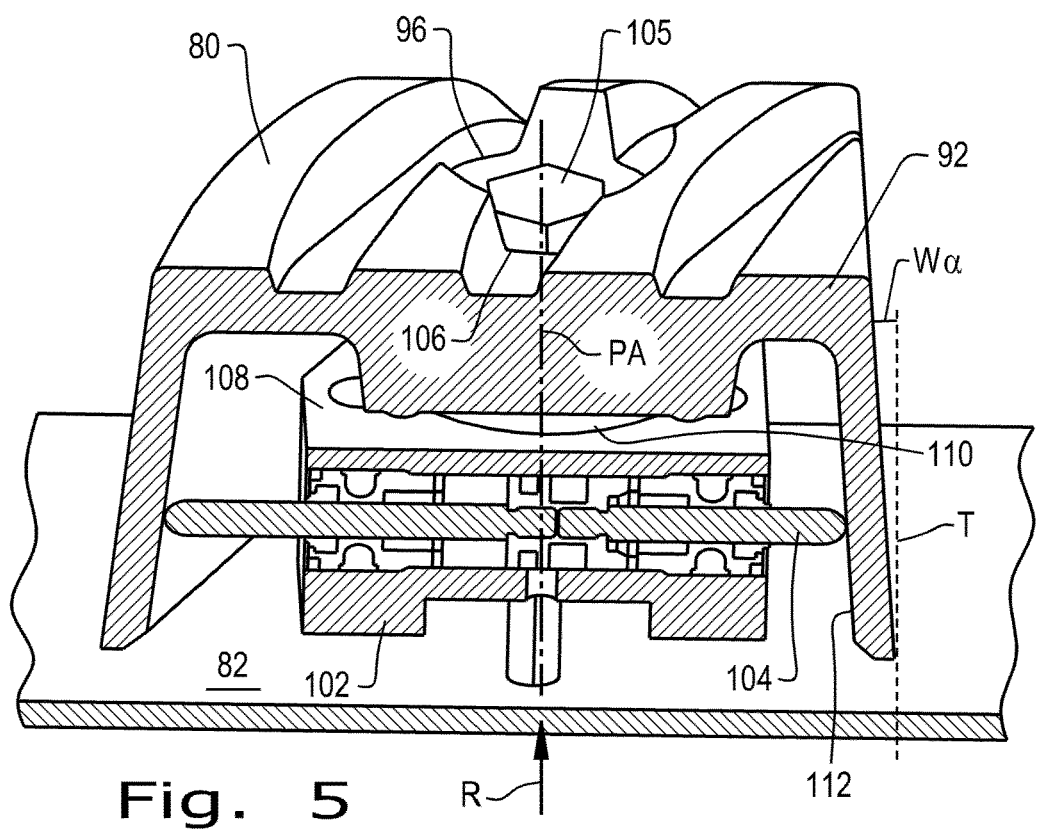
FIG. 5 is a cross-sectional view of the adjustable rasp bar shown in FIG. 4 taken along line 5-5.
Figure 6:
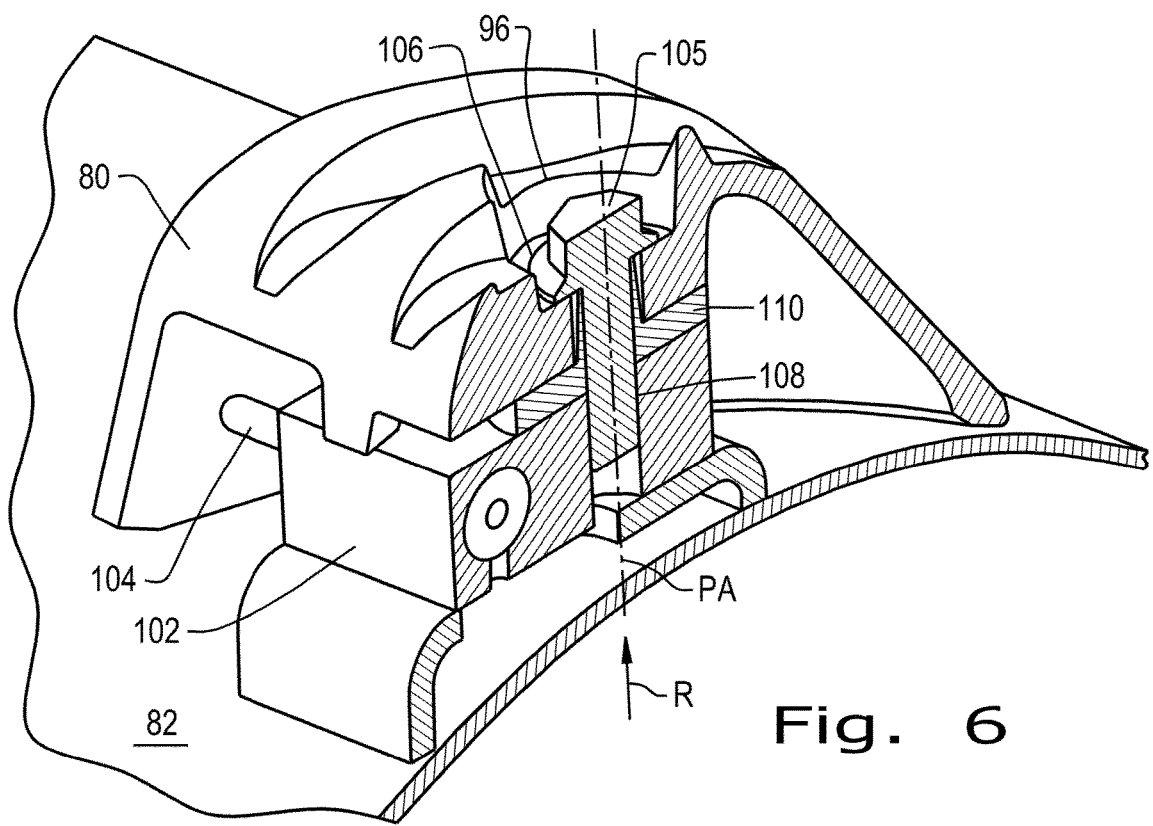
FIG. 6 is another cross-sectional view of the adjustable rasp bar shown in FIG. 4 taken along line 6-6.

Referring now to FIGS. 4-6, it can be seen that the rasp bars 80 are adjustable rasp bars by virtue of being pivotably connected to the rotor 40 by a pivot bolt 105 extending through the top surface 96 of the rasp bars 80 to define a pivoting axis PA extending in a radial direction R of the rotor 40. It should be appreciated that while all of the rasp bars 80 are shown as being adjustable rasp bars, only one of the rasp bars 80 may be adjustable or only some of the rasp bars 80 may be adjustable, if desired. As shown in FIGS. 4-6, an entirety of the adjustable rasp bars 80 are pivotable relative to the tangent T of the rotor 40, but this is not a requirement as will be further described herein. When the actuators 102 are partially or fully enclosed between the adjustable rasp bars 80 and the outer surface 82, the pivot bolt 105 can extend through a bolt opening 106 formed in the top surface 96 of the rasp bars 80, a housing 108 of the actuator 102, and the outer surface 82 of the rotor 40 so the rasp bars 80 are securely and pivotably connected to the rotor 40. Optionally, a washer 110 can be placed between the rasp bars 80 and the housing 108 to reduce friction produced between the housing 108 of the actuator 102 and the rasp bar 80 during pivoting.

As should be appreciated from FIGS. 3-6, when the actuator 102 is selectively activated by, for example, pressurized fluid, the piston rod 104 can extend and push on an interior surface 112 of the adjustable rasp bar 80 to selectively pivot an adjustable working surface 92 of the rasp bar 80 about the pivoting axis PA and change the working angle Wα defined by the adjustable working surface 92 relative to the tangent T of the outer surface 82. In this sense, the working angle Wα of the working surface(s) 92 of the adjustable rasp bar(s) 80 can be adjusted without having to remove the rasp bar(s) 80 from the rotor 40. Further, a user can selectively change the working angle Wα of the adjustable working surface(s) 92 by selectively controlling the actuator(s) 102 to adjust to differing harvesting and crop conditions. For example, a user can control the actuator(s) 102 to pivot the adjustable working surface(s) 92 to a lower working angle when slower movement of crop material across the length L of the rotor 40 is desired and to a higher working angle when faster movement of crop material across the length L of the rotor 40 is desired. Optionally, the user may choose to only selectively activate some of the actuators 102 to adjust the working angles Wα of some of the adjustable working surfaces 92, such as the working surfaces 92 near the transition area 84, without adjusting some of the other adjustable working surfaces. In this sense, being able to selectively adjust the adjustable working surfaces 92 to adjust the working angles Wα of the adjustable rasp bars 80 provides a user an additional tuning option for controlling performance of the threshing and separating system 24. Optionally, the adjustable rasp bar(s) 80 may have a spring (not shown) or other element associated therewith which can return the adjustable rasp bar(s) 80 to a "normal" position when the actuator(s) 102 is deactivated, i.e., not applying force to the adjustable working surface(s) 92, by, for example, releasing fluid pressure in the actuator(s) 102 via a selectively activated valve so the piston rod 104 is no longer extended by the fluid pressure. Alternatively, the pressure from crop material acting on the adjustable working surface(s) 92 during rotation of the rotor 40 may be sufficient to return the adjustable rasp bar(s) 80 to the normal position when the actuator(s) 102 is deactivated without the need for an additional element forcing the adjustable working surface(s) 92 back to the normal position.

From the foregoing, it should be appreciated that the adjustable rasp bar(s) 80 can have a plurality of working angles Wα by selectively controlling the extension of the coupled actuator(s) 102. For example, the adjustable rasp bar(s) may have a first working angle when the coupled actuator(s) is deactivated, a second working angle when the coupled actuator is activated by a first pressure, a third working angle when the coupled actuator is activated by a second fluid pressure greater than the first fluid pressure, etc. In this sense, the working angles Wα of the adjustable working surface(s) 92 of the adjustable rasp bar(s) 80 can be selectively adjusted in a variety of ways to control crop material flow along the length L of the rotor 40 and tune performance of the threshing and separating system 24.

Figure 7:
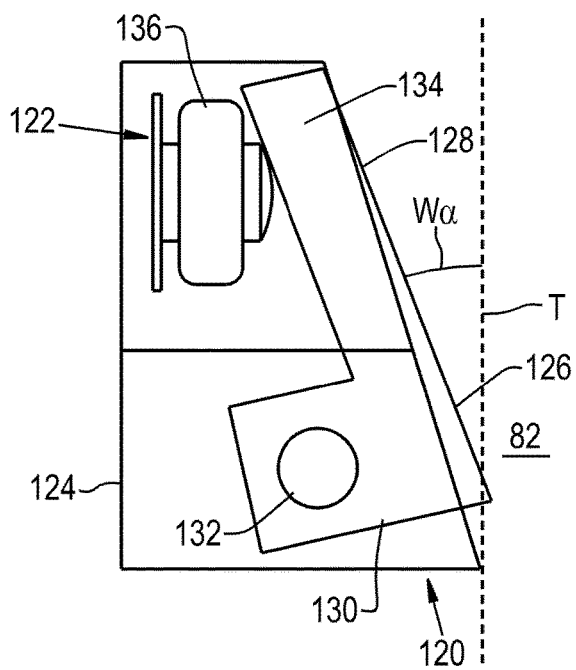
FIG. 7 is a cross-sectional view of an alternative exemplary embodiment of an adjustable rasp bar formed according to the present invention having a first working angle.
Figure 8:
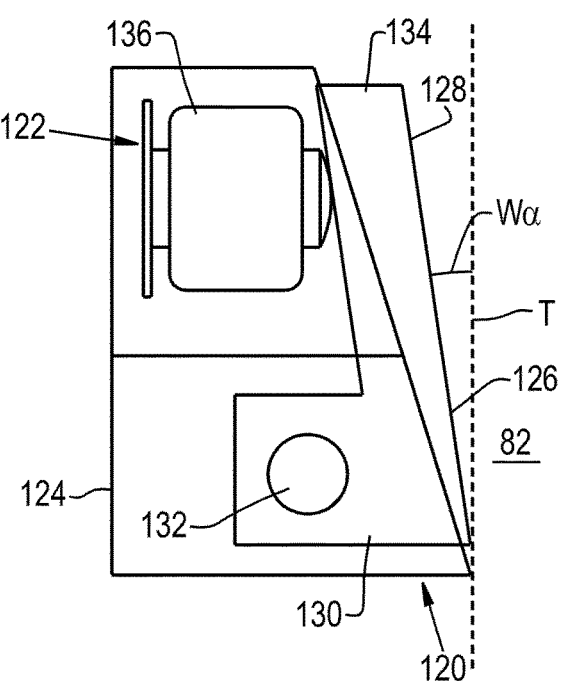
FIG. 8 is a cross-sectional view of the adjustable rasp bar shown in FIG. 7 having a second working angle.

Referring now to FIGS. 7-8, an alternative exemplary embodiment of an adjustable rasp bar 120 and coupled actuator 122 are shown. As can be seen, the adjustable rasp bar 120 can include a fixed portion 124 which is fixedly connected to the outer surface 82 of the rotor 40 and an adjustable portion 126 which is pivotably coupled to the rotor 40 and includes an adjustable working surface 128 which defines a working angle Wα relative to the tangent T of the outer surface 82 of the rotor 40. The adjustable portion 126 may, for example, be a flange with a connecting portion 130 connected to the fixed portion 124 at a pivot pin 132 and a working portion 134 including the adjustable working surface 128 connected to the connecting portion 130. The actuator 122 can comprise an elastic bladder 136 which is inflatable and deflatable to different internal volumes. When the elastic bladder 136 has little or no fluid therein, as shown in FIG. 7, the working angle Wα defined between the adjustable working surface 128 and the tangent T of the outer surface 82 can be at a maximum, such as 25 to 35°, since the actuator 122 produces a minimal pivoting force on the adjustable portion 126 of the adjustable rasp bar 120. When the elastic bladder 136 is filled with more fluid, as shown in FIG. 8, the elastic bladder 136 can expand and push on the adjustable portion 126 of the adjustable rasp bar 120 to pivot the adjustable portion 126 and adjustable working surface 128 to a lower working angle Wα than when the elastic bladder 136 has little or no fluid therein; for example, when the elastic bladder 136 is completely filled with fluid the working angle Wα may be between 5 and 15°. It should be appreciated that the elastic bladder 136 can be selectively and controllably filled with fluid to adjust the adjustable working angle Wα of the adjustable working surface 128 and the amount of fluid in the elastic bladder 136 can control the working angle Wα of the adjustable working surface 128. Further, it should be appreciated that the actuator 122 can include a piston rod (similar to previously described actuator 102) or other element capable of pushing or pulling on the adjustable portion 126, rather than the elastic bladder 136, to selectively control the working angle Wα defined between the adjustable working surface 128 and the tangent T of the outer surface 82 of the rotor 40.

Figure 9:
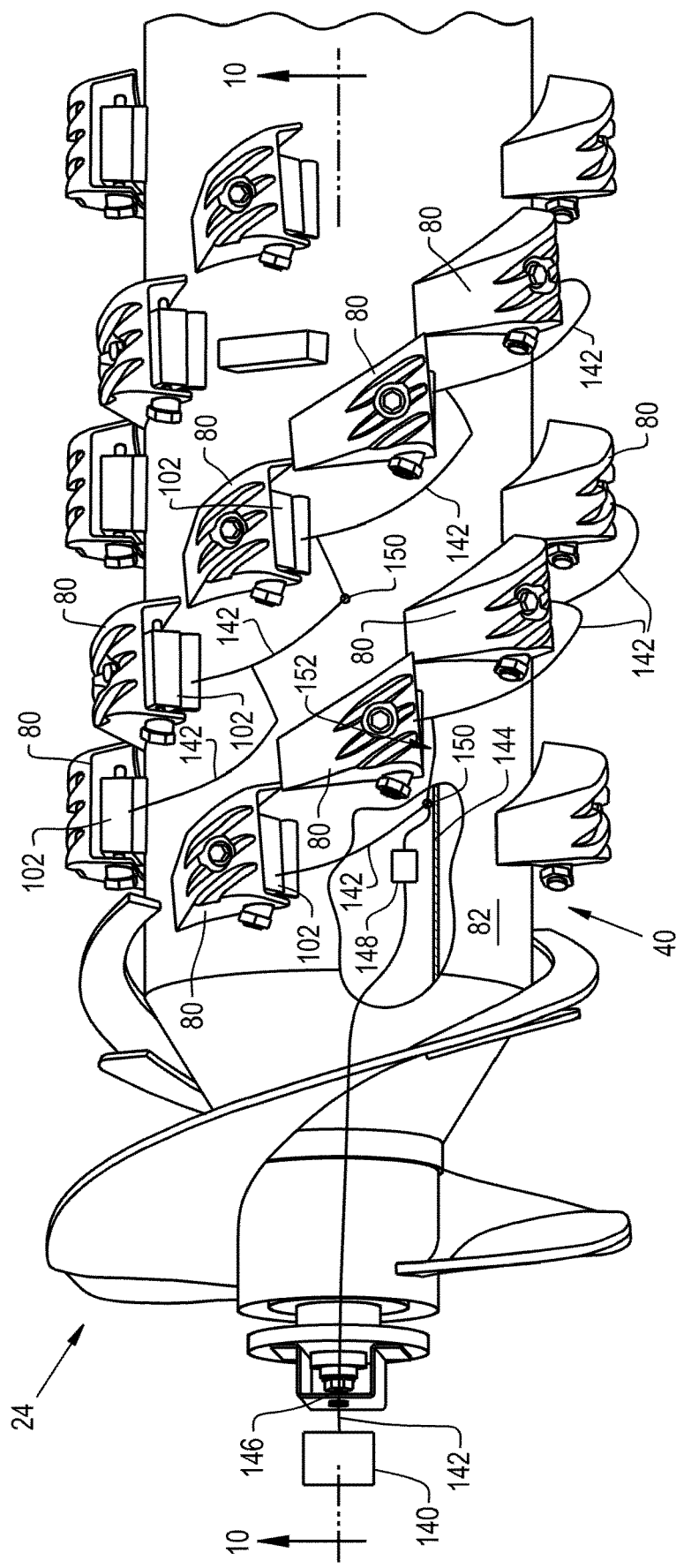
FIG. 9 is another perspective view of the threshing and separating system shown in FIG. 2 with fluid lines fluidly coupled to actuators of the system.
Figure 10:
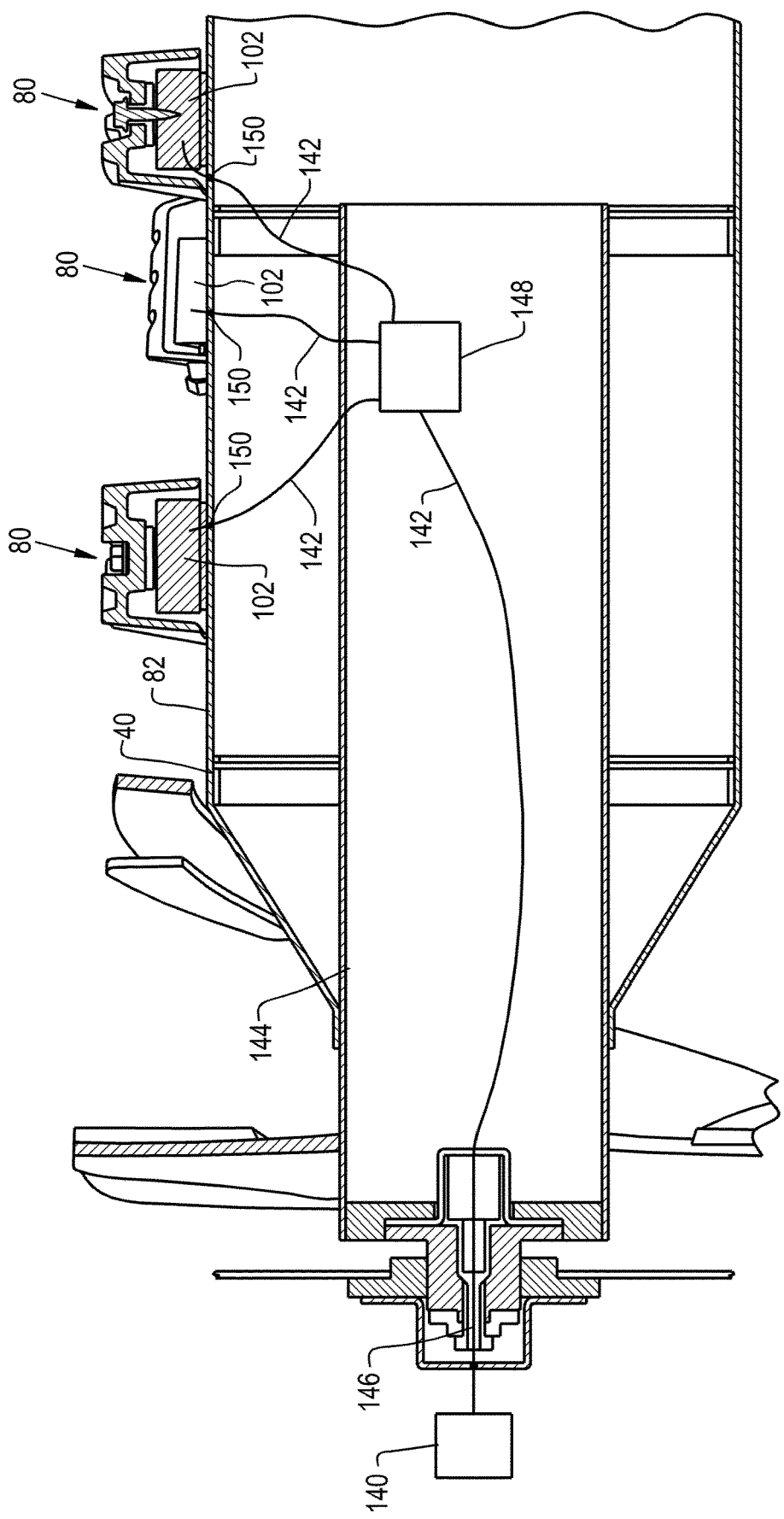
FIG. 10 is a cross-sectional view of the threshing and separating system shown in FIG. 9 taken along line 10-10.

Referring now to FIGS. 9-10, additional views of the threshing and separating system 24 are shown to illustrate how the actuators 102, 122 can be fluid coupled and/or wired. To power the actuators 102, 122 when the actuators 102, 122 are configured as fluid-activated actuators, a pressurized fluid source 140, such as a pump, outside the rotor 40 can have one or more fluid lines 142 which enter an interior 144 of the rotor 40 via a central opening 146 formed in the bearing shaft 88 of the rotor 40. The fluid lines 142 may be directly fluidly coupled to the actuators 102, 122 and pressurized fluid source 140 or, alternatively, may be fluidly coupled to one or more manifolds 148 within the interior 144 of the rotor 40 which are fluidly coupled to the actuators 102, 122 and pressurized fluid source 140 in order to fluidly couple the actuators 102, 122 to the pressurized fluid source 140. In one exemplary embodiment, the outer surface 82 of the rotor 40 can have a fluid opening 150 formed adjacent to one or more actuators 102, 122 and the fluid lines 142 extend through the fluid openings 150 to fluidly couple the actuators 102, 122 to the pressurized fluid source 140 via the manifold(s) 148. If desired, multiple actuators 102, 122 can be fluidly coupled to a fluid circuit 152 defined by multiple fluid lines 142 fluidly coupled to a common manifold which is fluidly coupled to the pressurized fluid source 140. It should be appreciated that the previously described fluid flow arrangement for the threshing and separating system 24 is exemplary only and any suitable configuration can be utilized to provide fluid to the actuators 102, 122 when the actuators 102, 122 are fluid-powered. Further, it should be appreciated that if the actuators are electrically powered, the electric actuators can be powered by any suitable configuration of electrical wiring electrically coupling the electric actuators to an electrical power source.

From the foregoing, it should be appreciated that the present invention also provides a method for adjusting crop material flow through a threshing and separating system 24 of an agricultural harvester 10 which includes a plurality of rasp bars 80, 120 connected to an outer surface 82 of a rotor 40, each rasp bar 80, 120 having a working surface 92, 128 defining a respective working angle Wα relative to a tangent T of the outer surface 82. The method includes selectively pivoting an adjustable working surface 92, 128 of at least one of the rasp bars 80, 120, which is an adjustable rasp bar 80, 120 to change the respective working angle Wα while the agricultural harvester 10 is operating. As used herein, the agricultural harvester 10 may be "operating" by virtue of traveling or having one or more systems of the agricultural harvester 10 in operation, as will be appreciated by a skilled person. Selective pivoting of the adjustable working surface 92, 128 may be performed according to any of the previously described exemplary embodiments, or any other suitable way. It should thus be appreciated that exemplary embodiments of the present invention allow the operator of the agricultural harvester 10 to adjust the working angle Wα of one or more adjustable working surfaces 92, 128 while the harvester 10 is in operation without having to stop operation of the harvester 10 to, for example, replace the rasp bar(s) or manually change the working angle(s) of the rasp bar(s). Exemplary embodiments formed in accordance with the present invention, therefore, can provide a non-disruptive way of changing the rasp bar working angles to adjust crop material flow through the threshing and separating system on the go and which can save the operator a significant amount of time and avoid the inconvenience associated with manually adjusting or replacing the rasp bars.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A threshing and separating system for an agricultural harvester, comprising:
   a concave having a plurality of perforations;
   a rotor having an outer surface and at least partially enclosed by the concave;
   a plurality of rasp bars connected to the outer surface of the rotor, each rasp bar having a working surface defining a working angle relative to a tangent of the outer surface, wherein at least one of the rasp bars is an adjustable rasp bar with an adjustable working surface pivotably coupled to the rotor; and
   an actuator coupled to the adjustable rasp bar and configured to selectively pivot the adjustable working surface to adjust the working angle of the adjustable rasp bar, wherein the actuator is at least partially enclosed between the adjustable rasp bar and the outer surface of the rotor.

2. The threshing and separating system of claim 1, wherein the adjustable rasp bar is pivotable about a pivoting axis extending in a radial direction of the rotor.

3. The threshing and separating system of claim 1, further comprising a pressurized fluid source fluidly coupled to the actuator.

4. The threshing and separating system of claim 3, wherein the actuator includes a piston rod or an elastic bladder configured to extend and adjust the working angle of the adjustable rasp bar.

5. The threshing and separating system of claim 1, wherein the adjustable rasp bar includes a fixed portion fixedly connected to the rotor and an adjustable portion pivotably coupled to the rotor, the adjustable portion including the adjustable working surface.

6. The threshing and separating system of claim 1, wherein an entirety of the adjustable rasp bar is pivotably coupled to the rotor.

7. The threshing and separating system of claim 1, wherein a plurality of the rasp bars are adjustable rasp bars.

8. The threshing and separating system of claim 7, further comprising:
a pressurized fluid source; and
a plurality of actuators coupled to the plurality of rasp bars, respectively,
wherein the actuator coupled to the adjustable rasp bar and the plurality of actuators are fluidly coupled to the pressurized fluid source.

9. The threshing and separating system of claim 8, wherein each actuator coupled to the pressurized fluid source is fluidly coupled to a manifold fluidly coupled to the pressurized fluid source.

10. The threshing and separating system of claim 7, further comprising at least one fluid line housed within an interior of the rotor and fluidly coupled to the pressurized fluid source and at least one of the plurality of actuators.

11. The threshing and separating system of claim 10, wherein the rotor has at least one fluid opening formed in the outer surface and the at least one fluid line extends through the at least one fluid opening.

12. The threshing and separating system of claim 1, wherein the actuator is a pneumatic actuator.

13. An agricultural harvester comprising:
a header; and
a threshing and separating system configured to receive crop material from the header, the threshing and separating system comprising:
a concave having a plurality of perforations;
a rotor having an outer surface and at least partially enclosed by the concave;
a plurality of rasp bars connected to the outer surface of the rotor, each rasp bar having a working surface defining a working angle relative to a tangent of the outer surface, wherein at least one of the rasp bars is an adjustable rasp bar with an adjustable working surface pivotably coupled to the rotor; and
an actuator coupled to the adjustable rasp bar and configured to selectively pivot the adjustable working surface to adjust the working angle of the adjustable rasp bar, wherein the actuator is at least partially enclosed between the adjustable rasp bar and the outer surface of the rotor.

14. A method of adjusting crop material flow through a threshing and separating system of an agricultural harvester, the threshing and separating system having (i) a plurality of rasp bars connected to an outer surface of a rotor, each rasp bar having a working surface defining a respective working angle relative to a tangent of the outer surface, and (ii) an actuator that is at least partially enclosed between the outer surface of the rotor and one of the rasp bars of the plurality of rasp bars, wherein the method comprises:
activating the actuator to selectively pivot an adjustable working surface of said one of the rasp bars to change the working angle of said one of the rasp bars while the agricultural harvester is operating.

* * * * *